United States Patent
Li et al.

(10) Patent No.: US 10,802,357 B2
(45) Date of Patent: Oct. 13, 2020

(54) PIXEL STRUCTURE, PIXEL UNIT AND DISPLAY PANEL

(71) Applicant: Xianyang Caihong Optoelectronics Technology Co.,Ltd, Xianyang (CN)

(72) Inventors: Zhuo Li, Xianyang (CN); Yuan-Liang Wu, Xianyang (CN)

(73) Assignee: XIANYANG CAIHONG OPTOELECTRONICS TECHNOLOGY CO.,LTD., Xianyang (CN)

( * ) Notice: Subject to any disclaimer, the term of this patent is extended or adjusted under 35 U.S.C. 154(b) by 0 days.

(21) Appl. No.: 16/503,679

(22) Filed: Jul. 5, 2019

(65) Prior Publication Data

US 2020/0057332 A1 Feb. 20, 2020

(30) Foreign Application Priority Data

Aug. 15, 2018 (CN) .......................... 2018 1 0929731

(51) Int. Cl.
*G02F 1/1343* (2006.01)

(52) U.S. Cl.
CPC .... *G02F 1/13439* (2013.01); *G02F 1/134309* (2013.01)

(58) Field of Classification Search
CPC .................................................. G02F 1/13439
See application file for complete search history.

(56) References Cited

U.S. PATENT DOCUMENTS

2016/0291419 A1* 10/2016 Yeh ........................ H01L 27/124

* cited by examiner

*Primary Examiner* — Sang V Nguyen
(74) *Attorney, Agent, or Firm* — WPAT, PC

(57) ABSTRACT

The invention discloses a pixel structure including: a main electrode, and a plurality of branch electrodes connected to the main electrode; wherein closed areas and open areas are formed among the plurality of the branch electrodes. The invention solves the problem that the liquid crystal at the edge position of the peripheral closed design scheme is easily affected by the electric field and the alignment disorder occurs by designing the branch electrode in the ITO electrode as the closed area and the open area, so that the display is uniform and the display effect is improved. Further, with respect to the design of the peripheral opening, the invention reduces the number of black streaks and increases the light transmittance due to the closed areas and the open areas of the interval distribution.

12 Claims, 4 Drawing Sheets

PIXEL STRUCTURE, PIXEL UNIT AND DISPLAY PANEL

FIELD OF THE DISCLOSURE

The present invention relates to the field of display, and in particular to a pixel structure, a pixel unit, and a display panel.

BACKGROUND OF THE DISCLOSURE

As the display specifications of liquid crystal displays continue to develop toward large sizes, the market demands more and more attention to high contrast, rapid response, and wide viewing angles for the performance requirements of liquid crystal displays. In order to overcome the viewing angle problem of a large-sized liquid crystal display panel, the wide viewing angle technology of the liquid crystal display panel must be continuously improved. Polymer stabilized vertical alignment liquid crystal (PSVA) is one of the wide viewing angle technologies currently widely used in liquid crystal display panels.

The ITO (Indium Tin Oxide) electrode of the existing PSVA liquid crystal panel adopts a peripheral closed design method, and in this way, the liquid crystal at the edge of the ITO electrode is easily affected by the electric field and the alignment disorder occurs, thereby causing the mura phenomenon. That is, the brightness of the display is not uniform.

SUMMARY OF THE DISCLOSURE

In order to solve the above problems in the prior art, the present invention provides a pixel structure, a pixel unit, and a display panel. The technical problem to be solved by the present invention is achieved by the following technical solutions.

Embodiments of the present invention provide a pixel structure, including:

a main electrode; and a plurality of branch electrodes connected to the main electrode;

wherein closed areas and open areas are formed among the plurality of the branch electrodes, any of the closed areas is located between adjacent two of the plurality of branch electrodes, and any of the open areas is located between adjacent two of the plurality of branch electrodes.

In a specific embodiment, an intersecting angle between any one of the plurality of branch electrodes and the main electrode is not equal to 90 degrees.

In a specific embodiment, the main electrode is a cross-shaped electrode, the cross-shaped electrode divides the pixel structure into four domains, and each adjacent two branch electrodes in any one of the domains are parallel to each other.

In a specific embodiment, the branch electrodes in one of adjacent two of the domains are not parallel to the branch electrodes in the other one of the adjacent two of the domains.

In a specific embodiment, the closed areas are alternately arranged with the open areas in a manner.

In a specific embodiment, every N numbers of adjacent closed areas as a repeating unit and every M numbers of adjacent open areas as another repeating unit are alternately arranged, where N and M are positive integers.

Embodiments of the present invention further provide a pixel unit, including:

a data line, a scan line;

a switch element, electrically connected with the data line and the scan line; and a pixel structure, electrically connected with the switch element;

wherein the pixel structure includes a main electrode and a plurality of branch electrodes connected to the main electrode, closed areas and open areas are formed among the plurality of the branch electrodes, and adjacent two of the plurality of branch electrodes have corresponding one of the closed areas or corresponding one of the open areas formed therebetween.

In a specific embodiment, an acute angle between the branch electrode and the data line is between 38 and 52 degrees.

In a specific embodiment, an acute angle between the branch electrode and the scan line is between 38 and 52 degrees.

Embodiments of the present invention further provide a display panel, including:

a first substrate;

a second substrate, disposed opposite to the first substrate;

a plurality of pixel units of the embodiment of the present invention, disposed between the first substrate and the second substrate; and a liquid crystal material, disposed between the first substrate and the second substrate, and uniformly distributed inside the display panel.

Compared with the prior art, the beneficial effects of the present invention:

the invention solves the problem that the liquid crystal at the edge position of the peripheral closed design scheme is easily affected by the electric field and the alignment disorder occurs by designing the branch electrode in the ITO electrode as the closed area and the open area, so that the display is uniform and the display effect is improved.

DETAILED DESCRIPTION OF PREFERRED EMBODIMENTS

The present invention will be further described in detail below with reference to specific embodiments, but the embodiments of the present invention are not limited thereto.

Embodiment 1

Figure 1:
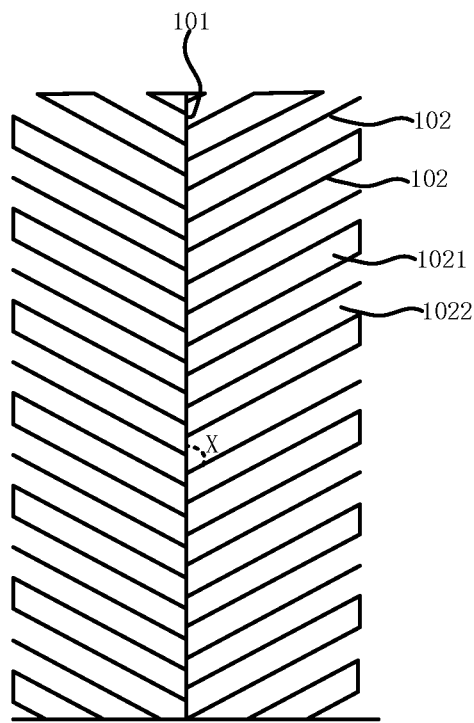
FIG. 1 is a schematic diagram of a pixel structure according to an embodiment of the present invention.

Referring to FIG. 1, FIG. 1 is a schematic diagram of a pixel structure according to an embodiment of the present invention, including:

a main electrode 101; and a plurality of branch electrodes 102 connected to the main electrode 101;

wherein, closed areas 1021 and open areas 1022 are formed among the plurality of the branch electrodes 102, any of the closed areas is located between adjacent two of the plurality of branch electrodes, and any of the open areas is located between adjacent two of the plurality of branch electrodes.

In a specific embodiment, an intersecting angle X between any one of the branch electrodes 102 and the main electrode 101 is not equal to 90 degrees.

The main electrode 101 in the embodiment is strip-shaped, the two sides of the main electrode 101 are the branch electrodes 102, each branch electrode 102 is also strip-shaped, and is connected to the main electrode 101. A slit is formed between the gaps between each two adjacent branch electrodes 102 and extends to an edge position of the pixel structure. The slit is generally referred to as an alignment slit, and the slit is closed at the edge position of the slit or the slit is not closed, so that the adjacent branch electrodes 102 are correspondingly formed with the closed areas 1021 or the open areas 1022.

The invention solves the problem that the liquid crystal at the edge position of the peripheral closed design scheme is easily affected by the electric field and the alignment disorder occurs by designing the branch electrode in the ITO electrode as the closed area and the open area, so that the display is uniform and the display effect is improved.

Figure 2:
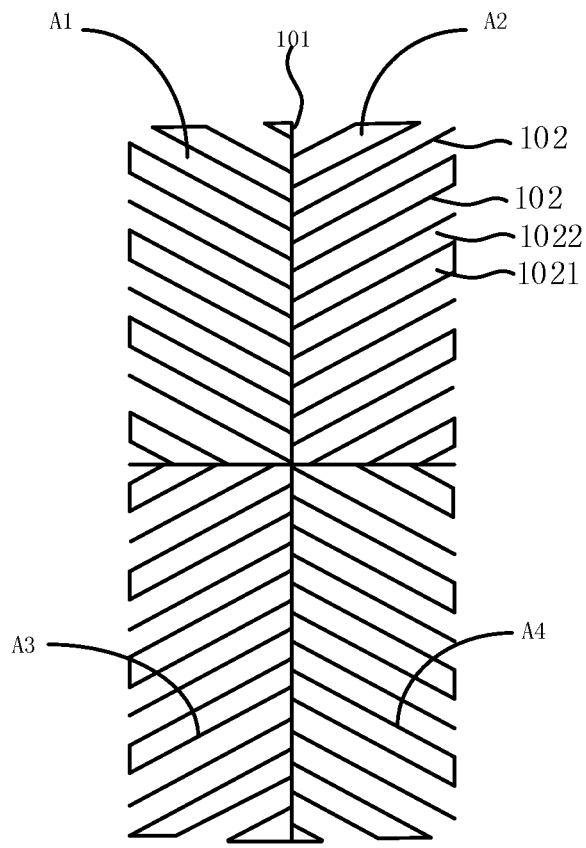
FIG. 2 is a schematic diagram of another pixel structure according to an embodiment of the present invention.

In a specific embodiment, referring to FIG. 2, the main electrode is a cross-shaped electrode, and the cross-shaped electrode divides the pixel structure into four domains, that is A1, A2, A3, and A4. The A1 domain is adjacent to the A2 domain and the A3 domain. In each of the above four domains, the branch electrodes in each domain are connected to the main electrode 101, so that the electrodes are interconnected. For one of the four domains, the inclination directions of all the branch electrodes in the domain are the same, that is, the adjacent two branch electrodes in any one of the domains are parallel to each other.

Taking the A1 domain as an example, the relative position of the A1 domain is located at the upper left of the pixel structure, and the tilt direction of the branch electrodes in the domain is also inclined toward the upper left direction. Preferably, the angle of inclination X of the inclination angle with respect to the axial main path electrode is between 38 and 52 degrees, that is, its acute angle with respect to the main electrode perpendicular to the axial direction is between 38 and 52 degrees.

Preferably, the branch electrodes in the adjacent two domains are not parallel to each other.

Taking the A2 domain as an example, the relative position of the A2 domain is located at the upper right of the pixel structure, and the tilt direction of the branch electrode in the domain is also inclined to the upper right direction; taking the A3 domain as an example, the relative position of the A3 domain is located at the lower left of the pixel structure, and the tilt direction of the branch electrode in the domain is also inclined toward the lower left direction; taking the A4 domain as an example, the relative position of the A4 domain is located at the lower right of the pixel structure, and the tilt direction of the branch electrode in the domain is also inclined toward the lower right direction; that is to say, the orientation of any one of the branch electrodes in the A1 domain is different from that of any one of the A2 domains, that is, the branch electrodes in the A1 domain are not parallel to the branch electrodes in the A2 domain.

Similarly, the branch electrodes in the A1 domain are not parallel to the branch electrodes in the A3 domain. In addition, since the present embodiment has four domains, the arrangement of the open area and the closed area in each domain may be the same or different, and may be arranged in the same arrangement for the convenience of product design. For example, the orientation of any one of the branch electrodes in the A1 domain is opposite to that of any one of the A4 domains, that is, the branch electrodes in the A1 domain are parallel to the branch electrodes in the A4 domain. Similarly, the branch electrodes in the A2 domain are parallel to the branch electrodes in the A3 domain. The orientation of the above electrodes can be set to improve the display color shift after voltage application. The above does not limit the arrangement of the closed areas 1021 or the open areas 1022 in each domain.

Further, the closed areas are spaced apart from the open areas. In combination with the above description, the closed areas and the open areas are formed between the two branch electrodes, therefore, in a pixel structure, around the pixel structure, it has both closed areas and open areas. For a higher lifting display effect, a preferred embodiment is such that the open areas and the closed areas are arranged as far as possible or exhibit a certain regularity.

Preferably, each of the N open areas is provided with M closed areas, wherein N and M are positive integers.

In order to more clearly illustrate the above arrangement, please continue to refer to FIG. 2. As can be seen from FIG. 2, adjacent closed areas are separated by two open areas. For any one of the domains, the area arrangement rule is that the open area, the open area, the closed area, the open area, the open area, and the closed area are sequentially circulated, that is, each of the two open areas is provided with one closed area.

Figure 3:
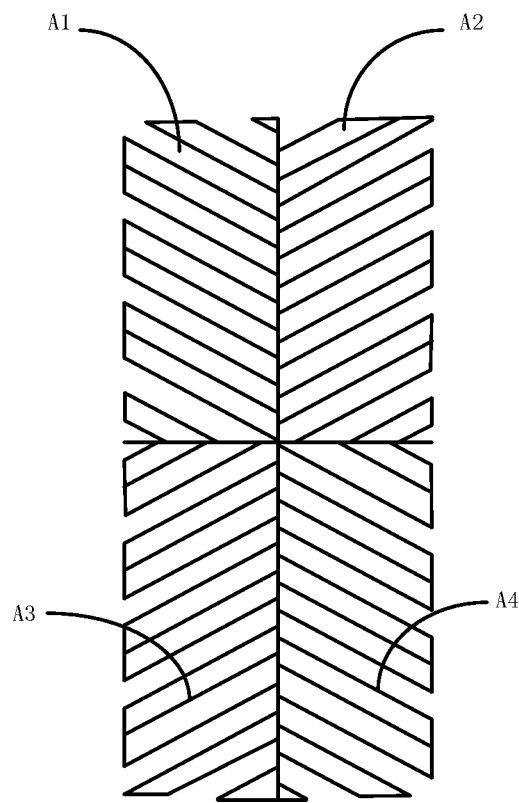
FIG. 3 is a schematic diagram of still another pixel structure according to an embodiment of the present invention.

Referring also to FIG. 3, it can be seen from FIG. 3 that adjacent open areas are separated by two closed areas. For any one of the domains, the area arrangement rule is that the closed area, the closed area, the open area, the closed area, the closed area, and the open area are sequentially cycled, that is, each closed area is provided with two closed areas.

Figure 4:
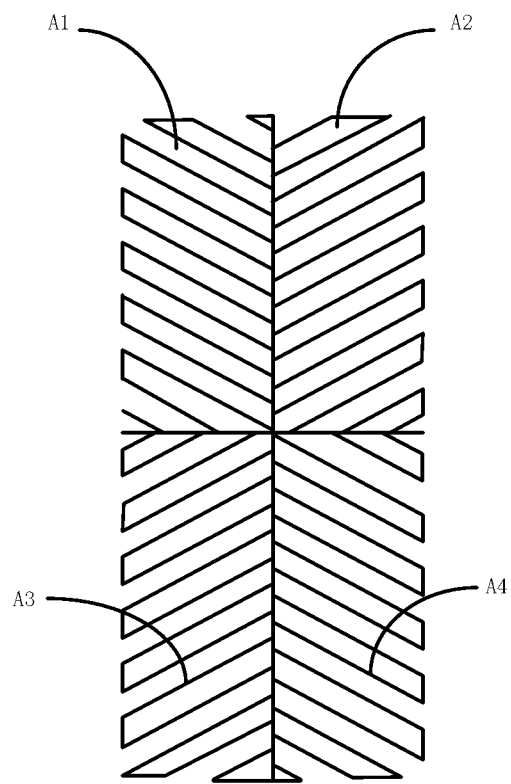
FIG. 4 is a schematic diagram of still another pixel structure according to an embodiment of the present invention.

Referring also to FIG. 4, it can be seen from FIG. 4 that adjacent open areas are separated by two closed areas. For any one of the domains, the area arrangement rule is that the closed area, the open area, the closed area, the open area, the closed area, and the open area are sequentially circulated, that is, each closed area is provided with one closed area.

Of course, the above FIG. 2 to FIG. 4 are only for explaining the implementation method of the embodiment, and it is not meant that N and M can only take the values in the example. For example, when N is 2 and M is 3, it means that there are 3 closed areas at intervals of 2 open areas. The arrangement rules of the area are an open area, an open area, an open area, a closed area, a closed area, an open area, an open area, an open area, a closed area, and a closed area.

Further, with respect to the design of the peripheral opening, the present invention reduces the number of black streaks and increases the light transmittance due to the closed area and the open area of the interval distribution.

Embodiment 2

Figure 5:
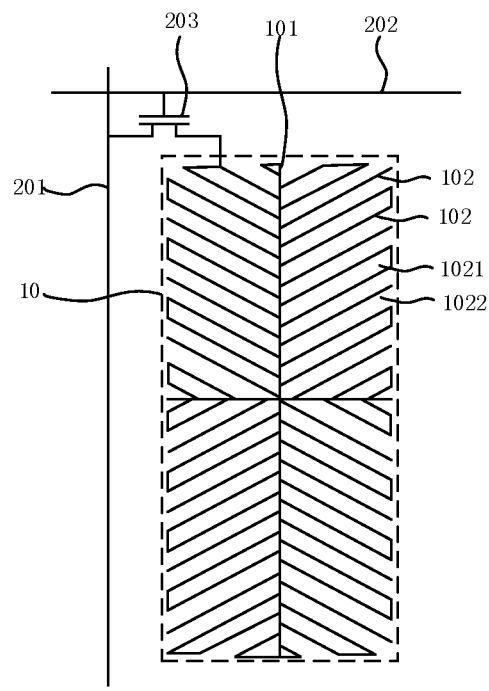
FIG. 5 is a schematic diagram of a pixel unit according to an embodiment of the present invention.

Referring to FIG. 5, FIG. 5 is a schematic diagram of a pixel unit according to an embodiment of the present invention.

The embodiment of the invention further provides a pixel unit, including:

a data line 201, a scan line 202;

a switch element 203, electrically connected with the data line 201 and the scan line 202; and a pixel structure 10, electrically connected with the switch element 203;

wherein the pixel structure 10 includes: a main electrode 101, a plurality of branch electrodes 102 connected to the main electrode 101, and closed areas 1021 or open areas 1022 formed between the adjacent two branch electrodes 102.

In this embodiment, the data line 201 is disposed perpendicular to the scan line 202. It should be noted that, in this embodiment, the data line 201 and the scan line 202 carry a pixel structure 10 as an example. In an actual display panel, one scan line 202 and one data line 201 correspond to a plurality of pixel structures on which the load is connected. The data line 201 is used to load the data driving signal onto the pixel structure 10. The data driving signal controls the pixel structure to display colors of different gray levels according to the magnitude of the driving voltage; the scan line 202 is used to load a scan drive signal to the pixel structure, and the scan drive signal controls whether the data drive signal is loaded onto the pixel structure 10. In one embodiment, the data line 201 and the scan line 202 are generally made of a conductive material, and may be a metal element, an alloy, a metal oxide, a metal nitride, a metal oxynitride or a combination of two or more of the above materials.

For the sake of better explanation, in the present embodiment, the switch element 203 is exemplified as a TFT (Thin Film Transistor). Of course, the switch element 203 is not limited to this element as long as the function can be realized. Specifically, the TFT includes a source, a drain, and a gate, wherein the source is connected to the data line 201, the gate is connected to the scan line 202, and the drain is connected to the pixel structure 10. In operation, the scan driving circuit generates a scan driving signal, which is transmitted to the gate of the TFT through the scan line, thereby controlling the gate to be turned on. At this time, the data driving signal generated by the data driving circuit is transmitted to the source of the TFT through the scan line. At this time, since the TFT gate is turned on, the data driving signal of the source is input into the pixel structure 10 to complete one driving.

Referring to FIG. 5, the long side of the pixel structure is parallel to the data line, and the short side of the pixel structure is parallel to the scan line. In order to improve the imaging effect of the liquid crystal material, it is preferable that an acute angle between the branch electrode and the data line is between 38 and 52 degrees.

Figure 6:
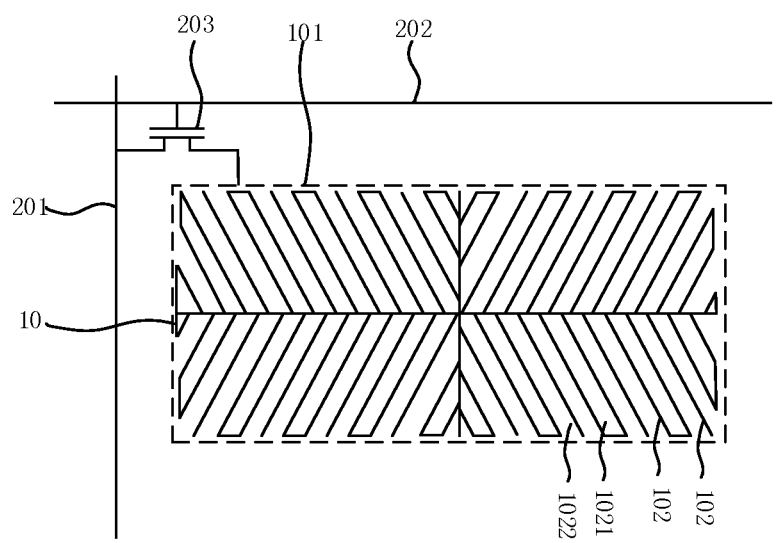
FIG. 6 is a schematic diagram of another pixel unit according to an embodiment of the present invention.

Referring to FIG. 6, the long side of the pixel structure is parallel to the scan line, and the short side of the pixel structure is parallel to the data line. In order to improve the image forming effect of the liquid crystal material, it is preferable that an acute angle between the branch electrode and the scanning line is between 38 and 52 degrees.

Figure 7:
FIG. 7 is a schematic diagram of a display panel according to an embodiment of the present invention.

Referring to FIG. 7, an embodiment of the present invention further provides a display panel, including:

a first substrate 11;

a second substrate 12, disposed opposite to the first substrate 11;

a plurality of pixel units 10 of the embodiment of the present invention, disposed between the first substrate and the second substrate; and a liquid crystal material 13, disposed between the first substrate 11 and the second substrate 12, and uniformly distributed inside the display panel.

The material of the first substrate and the second substrate may be a semiconductor material such as glass or quartz, or may be an organic polymer or the like, and the material of the first substrate may be the same as or different from the material of the second substrate. The main component of the liquid crystal material 13 is liquid crystal molecules, and the liquid crystal molecules are uniformly distributed inside the display panel, so that the liquid crystal molecules reach a better alignment after the voltage is applied, thereby reducing the number of black lines in the prior art, increasing the light transmittance, and improving the display effect.

In the several embodiments provided herein, it should be understood that the disclosed systems, devices, and methods may be implemented in other ways. For example, the device embodiments described above are merely illustrative. For example, the division of the unit is only a logical function division, and the actual implementation may have another division manner. For example, multiple units or components may be combined or integrated into another system, or some features may be omitted or not performed. In addition, the mutual coupling or direct coupling or communication connection shown or discussed may be an indirect coupling or communication connection through some interface, device or unit, and may be in an electrical, mechanical or other form.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

The above is a further detailed description of the present invention in connection with the specific preferred embodiments, and the specific embodiments of the present invention are not limited to the description. It will be apparent to those skilled in the art that the present invention may be made without departing from the spirit and scope of the invention.

What is claimed is:

1. A pixel structure, comprising:
a main electrode; and
a plurality of branch electrodes connected to the main electrode;
wherein closed areas and open areas are formed among the plurality of the branch electrodes, any of the closed areas is located between adjacent two of the plurality of branch electrodes, and any of the open areas is located between adjacent two of the plurality of branch electrodes;
wherein each of the closed areas is formed by a first slit between the adjacent two of the plurality of branch electrode and an end of the first slit away from the main electrode is closed;
wherein each of the open areas is formed by a second slit between the adjacent two of the plurality of branch electrode and an end of the second slit away from the main electrode is open;
wherein the plurality of branch electrodes have a same width.

2. The pixel structure according to claim 1, wherein an intersecting angle between any one of the plurality of branch electrodes and the main electrode is not equal to 90 degrees.

3. The pixel structure according to claim 1, wherein the main electrode is a cross-shaped electrode, the cross-shaped electrode divides the pixel structure into four domains, and each adjacent two branch electrodes in any one of the domains are parallel to each other.

4. The pixel structure according to claim 3, wherein the branch electrodes in one of adjacent two of the domains are not parallel to the branch electrodes in the other one of the adjacent two of the domains.

5. The pixel structure according to claim 1, wherein the closed areas are alternately arranged with the open areas in a manner.

6. The pixel structure according to claim 5, wherein every N numbers of adjacent closed areas as a repeating unit and every M numbers of adjacent open areas as another repeating unit are alternately arranged, where N and M are positive integers.

7. A pixel unit, comprising:
a data line;
a scan line;
a switch element, electrically connected with the data line and the scan line; and
a pixel structure, electrically connected with the switch element;
wherein the pixel structure comprises a main electrode and a plurality of branch electrodes connected to the main electrode, closed areas and open areas are formed among the plurality of the branch electrodes, and adjacent two of the plurality of branch electrodes have corresponding one of the closed areas or corresponding one of the open areas formed therebetween;
wherein each of the closed areas is formed by a first slit between adjacent two of the plurality of branch electrode and an end of the first slit away from the main electrode is closed;
wherein each of the open areas is formed by a second slit between adjacent two of the plurality of branch electrode and an end of the second slit away from the main electrode is open;
wherein the plurality of branch electrodes have a same width.

8. The pixel unit according to claim 7, wherein an acute angle between the branch electrode and the data line is between 38 and 52 degrees.

9. The pixel unit according to claim 7, wherein an acute angle between the branch electrode and the scan line is between 38 and 52 degrees.

10. A display panel, comprising:
a first substrate;
a second substrate, disposed opposite to the first substrate;
a plurality of pixel units, disposed between the first substrate and the second substrate; and
a liquid crystal material, disposed between the first substrate and the second substrate, and uniformly distributed inside the display panel;
wherein each of the plurality of pixel units, comprises:
a data line,
a scan line,
a switch element electrically connected with both the data line and the scan line, and
a pixel structure electrically connected with the switch element;
wherein the pixel structure comprises a main electrode and a plurality of branch electrodes connected to the main electrode, closed areas and open areas are formed among the plurality of the branch electrodes, and adjacent two of the plurality of branch electrodes have corresponding one of the closed areas or corresponding one of the open areas located therebetween;
wherein the liquid crystal material is correspondingly arranged inside the display panel uniformly;
wherein each of the closed areas is formed by a first slit between adjacent two of the plurality of branch electrode and an end of the first slit away from the main electrode is closed;
wherein each of the open areas is formed by a second slit between adjacent two of the plurality of branch electrode and an end of the second slit away from the main electrode is open;
wherein the plurality of branch electrodes have a same width.

11. The display panel according to claim 10, wherein an acute angle between the branch electrode and the data line is between 38 and 52 degrees.

12. The display panel according to claim 10, wherein an acute angle between the branch electrode and the scan line is between 38 and 52 degrees.

* * * * *